United States Patent
Vermeulen et al.

(10) Patent No.: US 11,982,401 B2
(45) Date of Patent: *May 14, 2024

(54) ADJUSTABLE LEVELLING PAD HAVING A PROTECTION CAP

(71) Applicant: AKTIEBOLAGET SKF, Gothenburg (SE)

(72) Inventors: Rene Vermeulen, Spijkenisse (NL); Abraham Hendrik Hooghart, Ridderkerk (NL)

(73) Assignee: AKTIEBOLAGET SKF, Gothenburg (SE)

( * ) Notice: Subject to any disclaimer, the term of this patent is extended or adjusted under 35 U.S.C. 154(b) by 20 days.

This patent is subject to a terminal disclaimer.

(21) Appl. No.: 17/582,264

(22) Filed: Jan. 24, 2022

(65) Prior Publication Data
US 2022/0243862 A1    Aug. 4, 2022

(30) Foreign Application Priority Data
Jan. 29, 2021  (DE) .......................... 102021102117.0

(51) Int. Cl.
*F16M 7/00*    (2006.01)
(52) U.S. Cl.
CPC ..................... *F16M 7/00* (2013.01)
(58) Field of Classification Search
CPC ... F16M 5/00; F16M 7/00; F16M 9/00; B23Q 1/0054; F16L 15/003; F16L 15/008
See application file for complete search history.

(56) References Cited

U.S. PATENT DOCUMENTS

| | | | |
|---|---|---|---|
| 2,246,436 A * | 6/1941 | Downey | F16L 15/00 285/349 |
| 3,144,066 A | 8/1964 | Hecke | |
| 3,879,071 A * | 4/1975 | Gockler | F16L 15/008 285/347 |

(Continued)

FOREIGN PATENT DOCUMENTS

| | | | |
|---|---|---|---|
| CH | 698093 A2 * | 5/2009 | A47B 91/026 |
| CN | 206234556 U | 6/2017 | |

(Continued)

OTHER PUBLICATIONS

Office Action from the United States Patent Office dated Sep. 16, 2022 in related U.S. Appl. No. 17/582,254, including examined claims 1-18.

(Continued)

*Primary Examiner* — Jonathan Liu
*Assistant Examiner* — Guang H Guan
(74) *Attorney, Agent, or Firm* — J-TEK LAW PLLC; Scott T. Wakeman; Mark A. Ussai (57) ABSTRACT

An adjustable levelling pad includes a first component having first screw threads, a second component having second screw threads cooperating with the first screw threads of the first component, a bearing element having a bearing surface cooperating with the first component and a protection cap fastened to the first component and extending towards the second component. The protection cap at least partially surrounds the second component and is configured to cooperate in a sealing manner with the second component.

13 Claims, 6 Drawing Sheets

(56) References Cited

U.S. PATENT DOCUMENTS

| | | | | |
|---|---|---|---|---|
| 5,499,791 | A | * | 3/1996 | Nakagawa .............. F16F 1/371 |
| | | | | 248/634 |
| 5,547,042 | A | * | 8/1996 | Platt .................. F01M 11/0408 |
| | | | | 138/89 |
| 6,068,234 | A | | 5/2000 | Keus |
| 6,889,946 | B2 | * | 5/2005 | Bizaj ........................ F16M 7/00 |
| | | | | 248/188.4 |
| 7,438,274 | B2 | | 10/2008 | Vermeulen |
| 7,717,395 | B2 | | 5/2010 | Rowan, Jr. et al. |
| 7,819,375 | B1 | | 10/2010 | Johansen |
| 8,104,724 | B2 | * | 1/2012 | Sorohan ................. A47B 91/16 |
| | | | | 248/188.9 |
| 9,285,067 | B2 | * | 3/2016 | Hooghart .............. F16B 5/0225 |
| 9,410,657 | B2 | | 8/2016 | Vogelaar et al. |
| 9,810,220 | B2 | | 11/2017 | Ghaisas |
| 9,989,090 | B2 | * | 6/2018 | Capoldi .............. F16C 33/1005 |
| 10,844,531 | B2 | * | 11/2020 | Zhao ..................... F16F 15/023 |
| 2022/0240675 | A1 | | 8/2022 | Hooghart et al. |
| 2022/0243861 | A1 | | 8/2022 | Hooghart et al. |
| 2022/0243862 | A1 | | 8/2022 | Vermeulen et al. |
| 2022/0243863 | A1 | | 8/2022 | Vermeulen et al. |
| 2023/0011564 | A1 | * | 1/2023 | Vermeulen ............... F16M 5/00 |
| 2023/0041643 | A1 | * | 2/2023 | Vermeulen ............ F16B 5/0233 |

FOREIGN PATENT DOCUMENTS

| | | | | |
|---|---|---|---|---|
| EP | 0316283 | A1 | * 5/1989 | .............. F16M 7/00 |
| WO | 2004061357 | A2 | 7/2004 | |
| WO | 2012146266 | A1 | 11/2012 | |

OTHER PUBLICATIONS

CNC Machining;"Thread Chamfer Start Standard"; Jan. 30, 2012, https://www.practicalmachinist.com/forum/threads/thread-chamfer-start-standard .240302/ (Year: 2012).

Lecture Notes, Jan. 26, 2015, https://www.practicalmachinist.com/forum/threads/thread-chamfer-start-standard.240302/ (Year:2015).

Written Opinion and Search report from the Netherlands Patent Office dated May 15, 2023 in related application No. NL2030529, and translation thereof.

* cited by examiner

ADJUSTABLE LEVELLING PAD HAVING A PROTECTION CAP

CROSS-REFERENCE

This application claims priority to German patent application no. 10 2021 102 117.0 filed on Jan. 29, 2021, the contents of which are fully incorporated herein by reference.

TECHNOLOGICAL FIELD

The present disclosure is directed to a system configured for use as an adjustable levelling support or pad for connecting a frame of a machine to a support. The disclosure further relates to an assembly comprising a piece of machinery, a support and an adjustable pad, wherein the piece of machinery is mounted to the support by means of the adjustable pad.

BACKGROUND

Adjustable levelling pads are generally configured to provide both support and vertical alignment capability with or without an associated anchor bolt.

Adjustable pads are well known in the art.

Figure 1A:
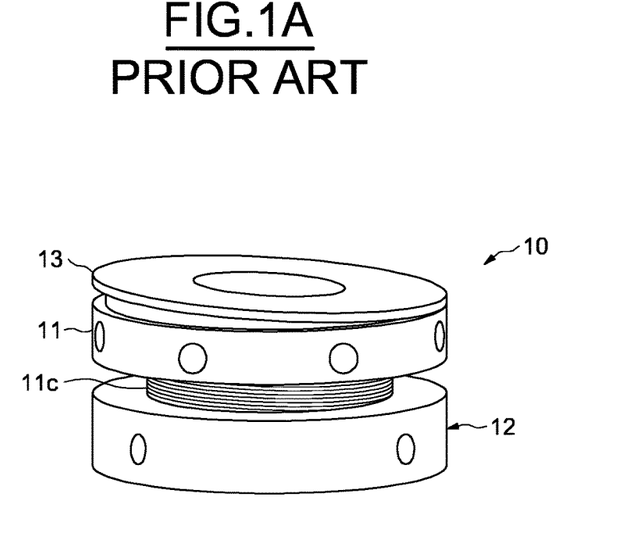
FIG. 1A is a perspective view of a conventional adjustable levelling pad.
Figure 1B:
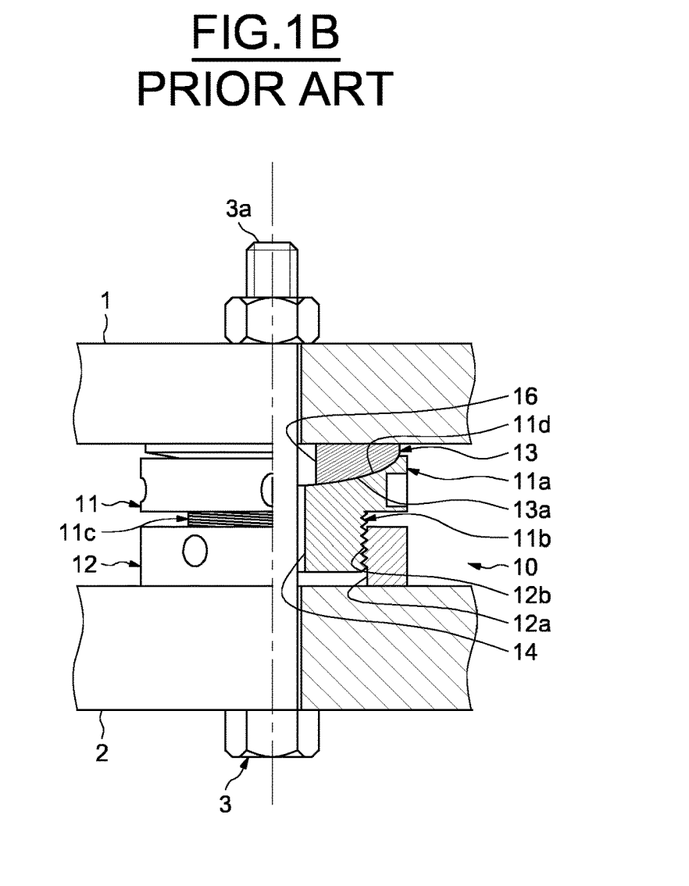
FIG. 1B is a partial cross-section of the adjustable levelling pad of FIG. 1A in operational use

Reference can be made to FIGS. 1A and 1B which illustrates a known adjustable levelling pad 10.

The adjustable levelling pad 10 is mounted to connect the frame 1 of a machine to a foundation or support 2, for example constructed from concrete or steel. Anchoring the frame 1 of the machine to the support 2 is here done with an anchor bolt 3.

The adjustable levelling pad 10 comprises a first component 11 or shaft element, a second component 12 or annular element and a third component 13 or bearing element. The first, second and third components 11, 12, 13 are coaxial along a vertical axis Z-Z'.

The first component 11 comprises an upper portion 11a and a lower portion 11b. The lower portion 11b has a cylindrical outer wall provided with an outer screw thread 11c. The upper portion 11a has an outer diameter greater than the outer diameter of the lower portion 11b so as to form an annular flange. As illustrated of FIG. 1B, the upper portion 11a has an upper surface 11d of concave shape. The upper surface 11d is rotationally symmetrical.

The first component 11 has a first through-hole 14 for accommodating a shank 3a of the bolt 3.

The second component 12 has a second through-hole with a cylindrical wall 12a provided with an inner screw thread 12b configured to engage with the outer screw thread 11c of the lower portion 11b of the first component 11.

The threaded portions 11c, 12b cooperate together and provide a vertical adjustment.

The third component 13 sits between the frame 1 of the machine and the upper portion 11a of the first component 11.

As shown in FIG. 1B, the third component 13 has a lower surface 13a engaging with the upper surface 11d of the upper portion 11a of the first component 11. The lower surface 13a has a convex shape and is rotationally symmetrical.

The lower surface 13a and the upper surface 11d are complementarily shaped so as to facilitate slight adjustment of the positions between the first component 11 and the third component 13 relative to one another, for example, in order to accommodate slight deviations between the piece of machinery 1 and the support 2.

The third component 13 has a through hole 16 having a diameter larger than the diameter of the first through-hole 14 in order to allow the shank 3a of the bolt 3 to pass through if an axis of symmetry of the lower surface 11d of the first component 11 is not aligned with an axis of symmetry of the lower surface 13a of the third component 13 in order to accommodate deviations from horizontal, parallel orientations of the piece of machinery 1 and the support 2.

The adjustable levelling pad 10 is sandwiched between the frame 1 of the machine and the support 2 and securely held in place by the bolt 3 and a nut 4 screwed on a part of the shank 3a extending beyond the piece of machinery 1. The height H of the adjustable levelling pad 10 is adjusted by means of screwing the first component 11 further into or further out of the second component 12.

As shown, the outer surface of the upper portion 11a has a specific profile, here blind holes arranged on the circumference of the outer surface, in order to be gripped by the operator. Such specific profile enables the operator to apply a torque to the first component 11.

Alternatively, the upper portion 11a of the first component 11 may have a polygonal outer circumference (not shown), for example, square or hexagonal, in a plane substantially perpendicular to an axis of the outer screw thread 11c.

Similarly, in order for an operator to apply a torque to the second component 12, the second component has a specific profile, here blind holes arranged on the circumference of the outer surface.

When installed, the adjustable levelling pad 10 is subjected to a mechanical load as a result of the weight of the frame 1 of the machine, and also as a result of reaction forces transmitted by the support 2 and/or by the frame 1 of the machine 1.

The maximum magnitude of the mechanical load carried by the known adjustable levelling pad 10 depends on the strength of the connection between the first component 11 and the second component 12. The maximum mechanical load is determined by the screwed connection between the first and second components 11, 12, which depends on the pitch of inner screw thread 12b and the outer screw thread 11c and on an engaging area over which the inner screw thread 12b and the outer screw thread 11c are engaged.

Such known adjustable pads have a limited load capacity due to the shear strength of the screw threads that provide the vertical alignment for the pad. Consequently, in order to overcome such disadvantage, adjustable pads have large diameters to provide enough cross-sectional area at the base of the threads in order to resist the weight of the machine being supported, the preload from the anchor bolt, and the shaking forces, such as wind loads or seismic loads.

Furthermore, in known adjustable levelling pads, foreign particles, such as dirt and moisture are able to enter into the threaded joint of the inner and outer screw threads. This is more important when the adjustable pad has not been screwed into its lowest position when it is in use. Indeed, there is then an axial gap between the second component or base part and the first component via which foreign particles are able to enter into the threaded joint. This can result in the threaded joint seizing and griping and not allowing further rotational movement.

SUMMARY

An aspect of the present disclosure is to provide an improved adjustable levelling pad in which the entry of foreign particles into the threaded joint is diminished and preferably entirely prevented.

An adjustable levelling pad according to the disclosure includes a first component or shaft element provided with first screw threads; a second component or lower adjustable part provided with second screw threads cooperating with the first screw threads of the first component; and a bearing element or third component having a bearing surface cooperating with the first component.

The adjustable pad includes a protection cap fastened to the first component and extending towards the second component, the protection cap surrounding at least partially the second component and being configured to cooperate in a sealing manner with the second component. As a result, foreign materials may be prevented from gathering in the screw threads of the first and second components.

The height of the adjustable levelling pad is adjusted by means of screwing the first component further into or further out of the second component. Indeed, by rotating the first component with respect to the second component, the vertical distance bridged by the adjustable pad can be set as desired.

The phrase "cooperating in a sealing manner", means that the protection cap prevents the infiltration of liquids, particles and dust from the external environment into the threaded joint formed by the first and second screw threads.

In an embodiment, the protection cap may be in radial contact with the outer circumference of the second portion.

As an alternative, a radial gap may exist between the protection cap and the outer circumference of the second portion, defining a sealing by narrow passage, or a labyrinth seal.

For example, the bearing surface of the bearing element is convex and configured to cooperate with a first concave surface of the first component. In an alternative, the bearing surface of the bearing element may be concave and configured to cooperate with a first convex surface of the first component. In a general way, the bearing surface of the bearing element and the upper surface of the first component have matching shapes.

In an embodiment, the first component is movable relative to the second component between a partially screwed position, in which the threads of the first component partially cooperate with the threads of the second component and a fully screwed position, in which the first component, notably its second portion, axially contacts an upper surface of the second component. The protection cap is configured to slide freely along the outer circumference of the second component when the first component is moved between the partially screwed position and the fully screwed position.

In other words, when the first component rotates relative to the second component, the protection cap slides along the cylindrical outer circumference of the second component.

For example, the protection cap is mounted in an annular groove provided on the circumference of the first component, notably its second portion. The annular groove of the second portion of the first component is, for example, located at the vicinity of its lower end. Alternatively, the annular groove could be provided on the outer wall at a distance of the lower end of the second portion.

For example, the protection cap comprises an annular mounting portion fastened to the first component and an annular protection flange extending towards the second component and radially surrounding in a sealing manner the outer circumference of the second component.

Advantageously, the mounting portion extends axially along an axis substantially parallel to an outer wall of the first component, notably its second portion, and the annular protection flange extends axially along an axis substantially parallel to the outer wall of the second component, the annular protection flange being connected to the annular mounting portion by a connecting portion.

For example, the connecting portion of the protection cap extends along an axis inclined relative to an axis perpendicular to the annular protection flange. For example, the axis of the connecting portion forms an angle comprised between 1° and 10° with the axis perpendicular to the annular protection flange.

The annular protection flange may have an outer diameter greater than the outer diameter of the mounting portion and slightly greater than the outer diameter of the second component.

The protection cap may be made of plastic material, for example for example polymeric material, such as polyether ether ketone (PEEK) or any thermoplastic polymer, etc.

In an embodiment, the outer wall of the second component comprises an annular recess receiving the annular protection flange of the protection cap.

The protection cap is thus configured to slide along the of the second component until abutting at the lower end of the recess. The recess forms a height indicator.

The annular protection flange may have an inner diameter slightly greater than the outer diameter of the annular recess.

The protection cap and the first and second components define an annular closed space.

By "slightly bigger", it is meant that the annular protection flange may slide along the outer circumference of the second component when the first and second components are screwed relative to one another, but maintains a radial contact with the circumference in order to form an obstacle to the penetration of foreign particles into the threaded joint.

The annular protection flange of the cap may be flexible so that when the first component is screwed fully into the second component, the flange deforms elastically in order to slide along the outer wall of the second component. The annular protection flange is thus capable, from the material used and/or its dimension, to be deformed under a slight force when and to return to its initial position when no force is exerted on the protection flange.

In an embodiment the protection cap is overmolded on the first component or may be mounted from the top once the first component is threaded in the second component.

For example, the first component comprises a first portion and a second portion having an outer diameter greater than the outer diameter of the first portion. The first portion is provided with the first screw threads and the protection cap is fastened to the second portion.

In an embodiment the adjustable pad comprises a mechanical limiter fastened to the outer circumference of the first component, notably in a recess in the first portion, and configured to abut axially against a shoulder provided on the inner wall of the second component when the first component is unscrewed from the second component, which avoid the first component from being detached from the second component.

The mechanical limiter is, for example, fastened at the lower end of the first component. The mechanical limiter may be annular and mounted in an annular recess. Alternatively, the pad may comprise two or more mechanical limiters, such as slugs arranged regularly on the circumference of the second portion of the first component.

The outer diameter of the mechanical limiter may be greater than the inner diameter threaded wall of the second component and less than the inner diameter of the shoulder of the second component.

In an embodiment, the adjustable pad comprises an annular sealing element fastened in an annular groove provided on the threaded wall of the second component, for example at the upper end of the second component or at an axial distance from the upper end. The annular sealing element is deformable and configured to deform over the threads between an initial position and a radially compressed position when the first component is mounted in the second component.

The annular sealing element is configured to increase friction with the first component. The inner diameter of the annular sealing element may be slightly less than the outer diameter of the screw threads of the first component so that the annular sealing element is deformed when screwing the first component in the second component and is radially compressed against the outer screw threads of the first component, which locks the first component against the second component.

Indeed, when the first component is screwed into the second component, the screw threads of the first component do not cut into the annular sealing element, but rather the sealing element deforms as it moves over the threads.

The annular sealing element may be, as a non-limiting example, elastically deformable. By "deformable", it is meant that the element is thus capable, from the material used and/or its dimension, to be deformed under a slight force and to return to its initial position when no force is exerted on the element.

In another embodiment, the annular sealing element may be, for example, made of polymeric material, such as nylon or other materials capable of increasing friction on the screw thread.

For example, the annular sealing element acts as a locking element increasing friction between the first and second components. The annular sealing element may be, for example an O-ring.

For example, the second component is radially delimited by an inner cylindrical wall and an outer cylindrical wall and axially by a lower surface and an upper surface.

The inner wall of the second component forms a second through-hole having a diameter receiving for example a shank of a bolt.

The bolt may be a standard bolt having a shank and a threaded part, the shank having a diameter greater than the diameter of the threaded part.

The inner wall may comprise a shoulder provided with an inner screw thread configured to engage with the outer screw thread of the lower portion of the first component. The inner diameter of the shoulder may be less than the inner diameter of the inner wall and greater than the outer diameter of the first portion of the first component.

The upper surface of the second component may taper in the radial outward direction at an angle comprised between 5° to 15°.

The outer diameter of the outer cylindrical wall of the second component may be greater than the outer diameter of the second portion of the first component.

The outer wall of the second component is provided with an annular recess having an outer diameter advantageously less than the outer diameter of the outer wall. For example, the second portion of the first component may have an upper surface of upwardly concave shape configured to cooperate with a lower surface of convex shape of the bearing element.

The lower surface and the upper surface may have complementarily shaped so as to facilitate slight adjustment of the positions between the first component and the bearing element relative to one another, for example, in order to accommodate slight deviations of the piece of machinery and the support.

The radius of curvature of the lower surface of the bearing element corresponds to the radius of curvature of the upper surface of the first component.

For example, the bearing element further has an upper bearing surface, substantially planar, configured to support the frame of the machine. The bearing element is thus able to move relative to the first component allowing the inclination of the upper surface to be adjusted with respect to the bottom surface of the frame of the machine, so that flat contact of the lower surface of the second component on the support can be achieved, as well as flat contact of the upper surface of the third component with the bottom surface of the frame of the machine to be supported.

The bearing element may be radially delimited by an outer cylindrical wall and an inner cylindrical wall forming a third through hole receiving the shank of the bolt.

For example, the third through-hole has a diameter larger than the diameter of the first through-hole in order to allow the shank of the bolt to pass through if an axis of symmetry of the upper surface of the first component is not aligned with an axis of symmetry of the lower surface of the bearing element in order to accommodate deviations from horizontal, parallel orientations of the frame of the machine and the support.

The outer cylindrical wall of the bearing element may have an outer diameter greater than the outer diameter of the lower portion of the first component and less than the outer diameter of the flange of the first component. This provides a relatively wide range of inclinations for adjusting the inclination of the adjustable pad, even when the first component has been completely screwed into the second component.

In an embodiment, the adjustable pad may comprise a shear plate mounted in the second component, below the first component. Advantageously, the shear plate is radially delimited by an inner cylindrical wall having an inner diameter and an outer cylindrical wall having an outer diameter. The outer diameter may be is slightly less than the inner diameter of the second component and greater than the inner diameter of the thread portion.

According to another aspect, the disclosure further relates to an assembly comprising a piece of machinery, a support and an adjustable pad as described before, wherein the piece of machinery is mounted to the support by means of the adjustable pad.

The shear plate may be further axially delimited by a lower surface bearing on the support and an upper surface axially located below the shoulder of the second component.

The shear plate is advantageously drilled and reamed at location, so that the diameter of the through-hole of the shear plate is substantially equal to the outer diameter of the fitted part of the bolt. The bolt may be a fitted bolt having a fitted part or shank and a threaded part, the fitted part having a diameter greater than the diameter of the threaded part.

When a radial thrust force is applied to the frame of the machine, the shear plate allows a significant reduction of bending forces applied to the fitted part.

In an embodiment, the diameter of the through-hole of the bearing element is substantially equal to the outer diameter of the fitted part of the bolt. The bearing element is advantageously drilled and reamed at location, so that the diameter of the through-hole of the bearing element is substantially equal to the outer diameter of the fitted part.

Adding a bearing element having a through-hole having a diameter substantially equal to the outer diameter of the fitted part allows such bending forces to be avoided.

BRIEF DESCRIPTION OF THE DRAWINGS

The present invention and its advantages will be better understood by studying the detailed description of specific embodiments given by way of non-limiting examples and illustrated by the appended drawings of which.

DETAILED DESCRIPTION

The expressions "outer" and "inner" refer to the longitudinal axis Z-Z' of the adjustable levelling pad 100, the inner parts being closer to the axis than the outer parts.

Figure 2A:
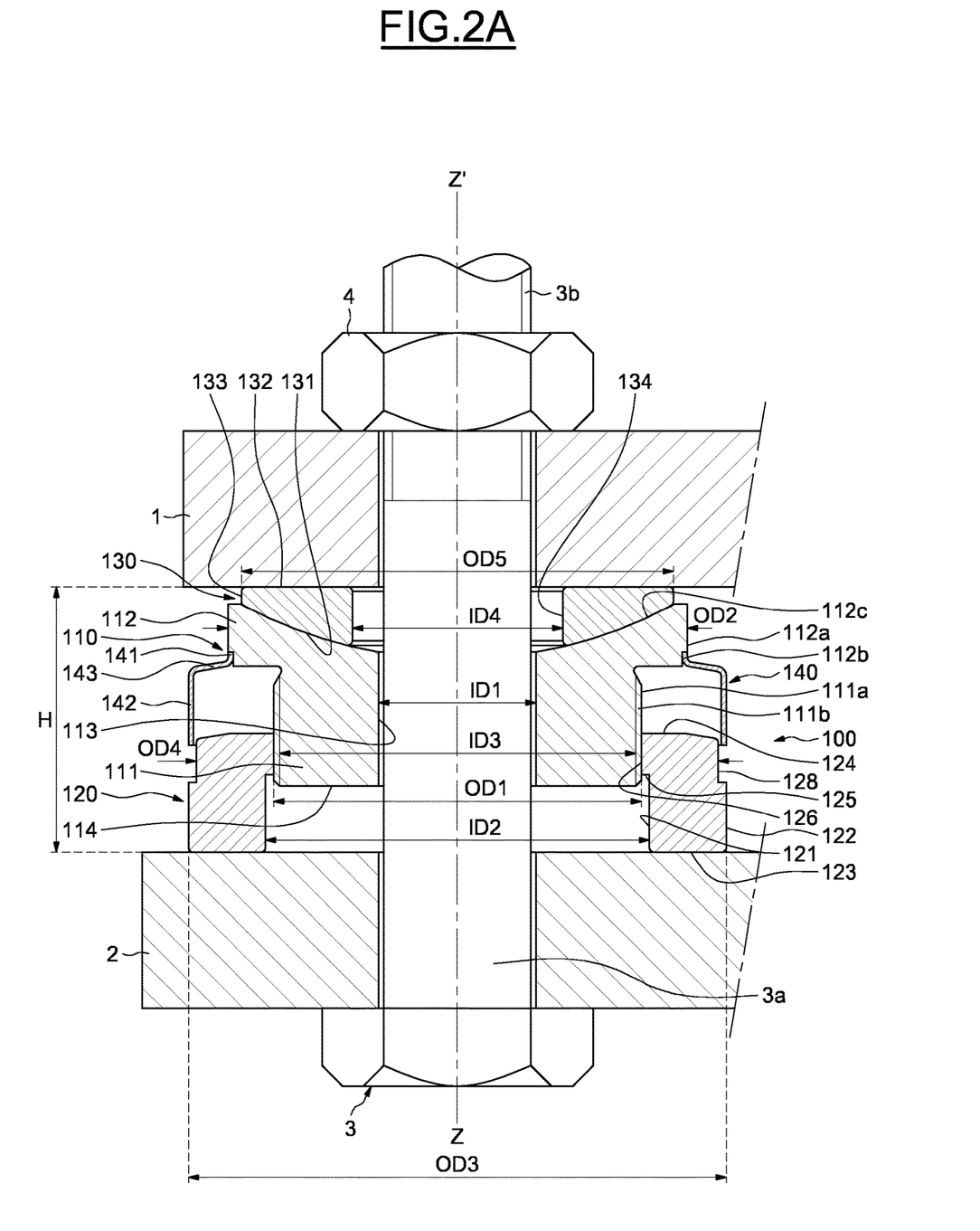
FIGS. 2A and 2B are a cross-section view of an adjustable levelling pad according to an embodiment of the invention, in operational use, respectively in a partially screwed position and in a fully screwed position.
Figure 2B:
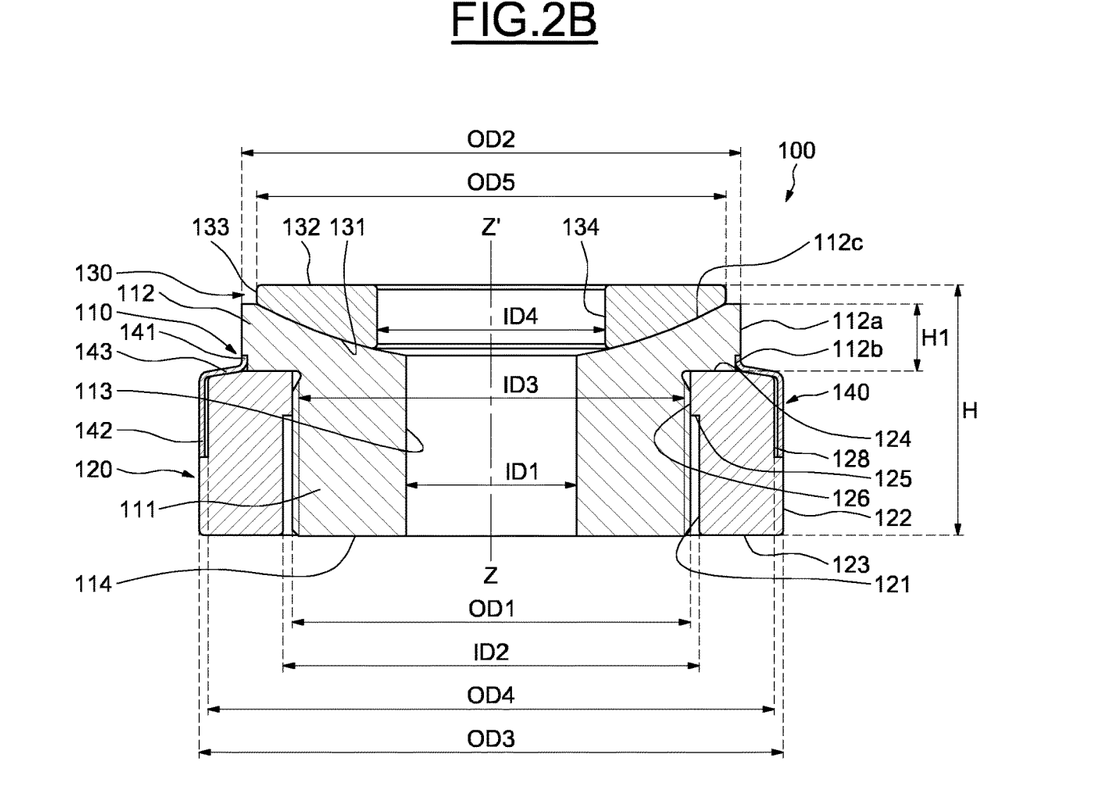

The adjustable levelling pad 100 is mounted to connect a frame 1 of a machine to a foundation or support 2, for example constructed from concrete or steel. Anchoring the frame 1 of the machine to the support 2 is here done with an anchor bolt 3.

The adjustable levelling pad 100 comprises a first component 110 or shaft element, a second component 120 or lower adjustable part and a third component 130 or bearing element. The first, second and third components 110, 120, 130 are coaxial along a vertical axis Z-Z'.

The adjustable levelling pad 100 is symmetrical relative to the longitudinal axis Z-Z'.

The first component 110 comprises a lower portion 111 and an upper portion 112. The lower portion 111 has a cylindrical outer wall 111a provided with an outer screw thread 111b. The upper portion 112 has an outer diameter OD2 greater than the outer diameter OD1 of the lower portion 111 so as to form an annular flange. The upper portion 112 has a height H1. The upper portion 112 has a cylindrical outer wall 112a provided with an annular groove 112b at the vicinity of its lower end.

Alternatively, the annular groove 112b could be provided on the outer wall 112a at a distance of the lower end of the upper portion 112.

As illustrated of FIGS. 2A and 2B, the upper portion 112 has an upper surface 112c of upwardly concave shape. The upper surface 112c is rotationally symmetrical.

The first component 110 has a first through-hole 113 extending axially from the upper surface 112c to the lower surface 114 of the first component 110. The first through-hole 113 has a diameter ID1 configured for accommodating a shank 3a of the bolt 3.

As illustrated, the bolt 3 comprises shank 3a and a threaded part 3b, the shank 3a having a diameter greater than the diameter of the threaded part 3b.

The second component 120 is radially delimited by an inner cylindrical wall 121 and an outer cylindrical wall 122 and axially by a lower surface 123 and an upper surface 124.

The inner wall 121 of the second component 120 forms a second through-hole having a diameter ID2 receiving the shank 3a of the bolt 3.

The inner wall 121 comprises a shoulder 125 provided with an inner screw thread 126 configured to engage with the outer screw thread 111b of the lower portion 111 of the first component 110. The inner diameter ID3 of the shoulder 125 is less than the inner diameter ID2 of the inner wall 121 and greater than the outer diameter OD1 of the lower portion 111 of the first component 110. The threaded portions 111b, 126 cooperate together and provide a vertical adjustment.

The upper surface 124 of the second component 120 tapers in the radial outward direction at an angle relative to an axis perpendicular to the vertical axis Z-Z' of from 5° to 15°.

The outer diameter OD3 of the outer cylindrical wall 122 of the second component 120, which is also a maximum width of the second component 120, is greater than the outer diameter OD2 of the upper portion 112 of the first component 110, which is also a maximum width of the first component 110.

As shown, the outer wall 122 of the second component 120 is provided with an annular recess 128 having an outer diameter OD4 less than the outer diameter OD3 of the outer wall 122.

The first component 110 is movable relative to the second component 120 between a partially screwed position, shown on FIG. 2A, in which the threads 111b of the first component 110 partially cooperate with the threads 126 of the second component 120 and a fully screwed position, shown on FIG. 2B, in which the upper portion or flange 112 of the first component 110 axially contacts the upper surface 124 of the second component 120.

The third component 130 sits between the frame 1 of the machine and the upper portion 112 of the first component 110. As shown in FIGS. 2A and 2B, the third component 130 has a lower surface 131 engaging with the upper surface 112c of the upper portion 112 of the first component 110. The lower surface 131 has a convex shape and is rotationally symmetrical.

The lower surface 131 and the upper surface 112c are complementarily shaped so as to facilitate slight adjustment of the positions between the first component 110 and the third component 130 relative to one another, for example, in order to accommodate slight deviations from the piece of machinery 1 and the support 2.

The radius of curvature of the lower surface 131 of the third component 130 corresponds to the radius of curvature of the upper surface 112c of the first component 110.

The third component 130 further has a substantially planar upper bearing surface 132 configured to support the frame 1 of the machine. The third component 130 is thus able to move with respect to the first component 110 allowing the inclination of the upper surface 132 to be adjusted with respect to the bottom surface of the frame 1 of the machine, so that flat contact of the lower surface 123 of the second component 120 on the support 2 can be achieved, as well as flat contact of the upper surface 132 of the third component with the bottom surface of the frame 1 of the machine to be supported.

The third component 130 is radially delimited by an outer cylindrical wall 133 and an inner cylindrical wall 134 forming a third through hole receiving the shank 3a of the bolt 3.

The third through-hole 134 has a diameter ID4 larger than the diameter ID1 of the first through-hole 113 in order to allow the shank 3a of the bolt 3 to pass through if an axis of symmetry of the upper surface 112c of the first component 110 is not aligned with an axis of symmetry of the lower surface 131 of the third component 130 in order to accommodate deviations from horizontal, parallel orientations of the frame 1 of the machine and the support 2.

The outer cylindrical wall 133 of the third component 130 has an outer diameter OD5 greater than the outer diameter OD1 of the lower portion 111 of the first component 110 and less than the outer diameter OD2 of the flange 112 of the first component 110. This provides a relatively wide range of inclinations for adjusting the inclination of the adjustable pad, even when the first component 110 has been completely screwed into the second component 120.

As illustrated, the adjustable levelling pad 100 is sandwiched between the frame 1 of the machine and the support 2 and securely held in place by the bolt 3 and a nut 4 screwed on a part of the shank 3a extending beyond the machine 1.

The height H of the adjustable levelling pad 100 is adjusted by screwing the first component 110 further into or further out of the second component 120. Indeed, by rotating the first component 110 with respect to the second component 120, the vertical distance bridged by the adjustable pad 100 can be set as desired.

The outer wall 112a of the first component 110 and the outer wall 122 of the second component 120 may each be provided with fastening blind holes or recesses designed to cooperate with a suitable tool for screwing and unscrewing the first component 110 relative to the second component 120.

The first, second and third components 110, 120, 130 are made, for example, of steel, preferably high-grade steel.

As illustrated on FIGS. 2A and 2B, the adjustable pad 100 further comprises a cylindrical protection cap 140 fastened to the first component 110, notably in an annular groove 112b provided on the circumference of the flange 112 of the first component 110, and extending towards the second component 120. As illustrated, the protection cap 140 surrounds partially the annular recess 128 of the second component 120.

Alternatively, the outer wall 122 of the second component 120 may not comprise the annular recess 128. In this case, the protection cap 140 surrounds partially the outer wall 122 of the second component 120

The protection cap 140 comprises an annular mounting portion 141 fastened in the annular groove 112b of the first component 110 and an annular protection flange 142 designed to surround the outer circumference of the second component 120. The annular protection flange 142 of the protection cap 140 cooperates in a sealing manner with the outer circumference of the second component 120, preventing the infiltration of liquids, particles and dust from the external environment into the threaded joint formed by the first and second screw threads.

As illustrated, the annular protection flange 142 is in radial contact with the outer circumference of the second portion 120. As an alternative, a radial gap may exist between the protection cap 140 and the outer circumference of the second portion 120, defining a sealing by narrow passage, or a labyrinth seal.

The mounting portion 141 extends axially along an axis substantially parallel to the outer wall 112a of the flange 112 of the first component 110. The annular protection flange 142 extends axially along an axis substantially parallel to the outer wall 112a of the flange 112 of the first component 110.

The annular protection flange 142 is connected to the annular mounting portion 141 by a connecting portion 143. The connecting portion 143 extends along an axis inclined relative to an axis perpendicular to the annular protection flange 142. For example, the axis of the connecting portion 143 forms an angle of between 1° and 10° with the axis perpendicular to the annular protection flange 142.

The annular protection flange 142 has an outer diameter greater than the outer diameter of the mounting portion 141 and slightly greater than the outer diameter of the second component 120.

The protection cap 140 is made of plastic material, for example for example polymeric material, such as polyether ether ketone (PEEK) or any thermoplastic polymer, etc. The protection cap 140 may be overmolded on the first component 110 or may be mounted from the top once the first component 110 is threaded in the second component 120. Alternatively, the protection cap 140 may be fixed to the first component 110.

When the first component 110 rotates relative to the second component 120, the protection cap 140 slides along the cylindrical outer circumference of the second component 120. The protection cap 140 is configured to slide along the annular recess 128 of the second component 120 until abutting at the lower end of the recess 128. The recess 128 forms a height indicator.

The annular protection flange 142 has an inner diameter slightly greater than the outer diameter OD4 of the annular recess 128.

The protection cap 140 and the first and second components 110, 120 define an annular closed space.

By "slightly greater", it is meant that the annular protection flange 142 may slide along the outer circumference of the second component 120 when the first and second components are screwed relative to one another, but maintains a radial contact with the circumference in order to form an obstacle to the penetration of foreign particles into the threaded joint.

As a result, foreign materials may be prevented from gathering in the screw threads of the first and second components 110, 120.

The annular protection flange 142 of the cap 140 is flexible so that when the first component 110 is screwed completely into the second component 120, the flange 142 deforms elastically in order to slide along the outer wall 122 of the second component 120. The annular protection flange 142 is thus capable, from the material used and/or its dimension, to be deformed under a slight force when and to return to its initial position when no force is exerted on the protection flange 142.

Figure 3:
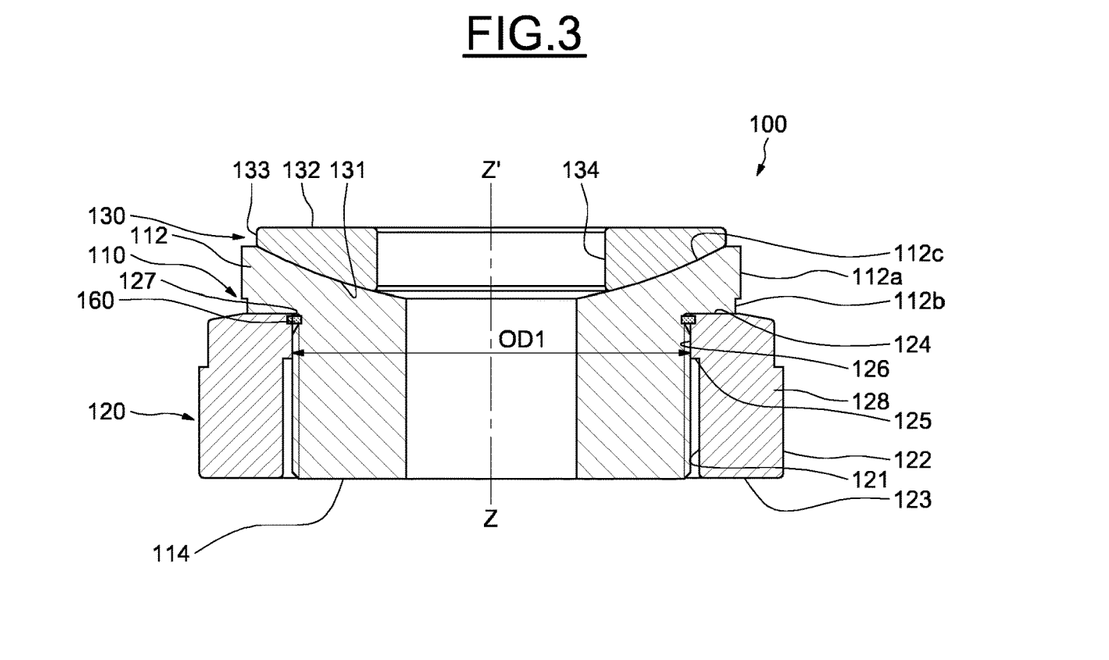
FIG. 3 is a cross-section view of an adjustable levelling pad according to another embodiment of the invention.

Another embodiment of an adjustable pad shown on FIG. 3, in which the same elements bear the same reference numerals, differs from the adjustable pad of FIG. 2B only by the fact that the adjustable pad does not comprise a protection cap 140 and comprises an annular sealing element 160.

The annular sealing element 160 is fastened in an annular groove 127 provided on the threaded wall 126 of the second component 120 at the upper end of the second component 120. Alternatively, the annular sealing element 160 may be fastened on the inner threaded wall 126 the second component 120 at an axial distance from the upper end of the second component 120. This annular sealing element 160 is deformable, for example elastically, between an initial position and a radially compressed position when the first component 110 is mounted in the second component 120.

The annular sealing element 160 is configured to increase friction with the first component 110. The inner diameter of the annular sealing element 160 is slightly less than the outer diameter OD1 of the screw threads 111b of the first component 110, so that the annular sealing element 160 is deformed when screwing the first component 110 into the second component 120 and is radially compressed against the outer screw threads 11b of the first component 110, which locks the first component 110 against the second component 120.

Indeed, when the first component 110 is screwed into the second component 120, the screw threads 111b of the first component 110 do not cut into the annular sealing element 160, but rather the sealing element 160 deforms as it moves over the threads.

The annular sealing element 160 acts as a locking element increasing friction between the first and second components 110, 120. The annular sealing element 160 is, for example an O-ring. The annular sealing element 160 is for example, made in polymeric material, such as nylon or other materials capable of increasing friction on the screw thread.

Figure 4A:
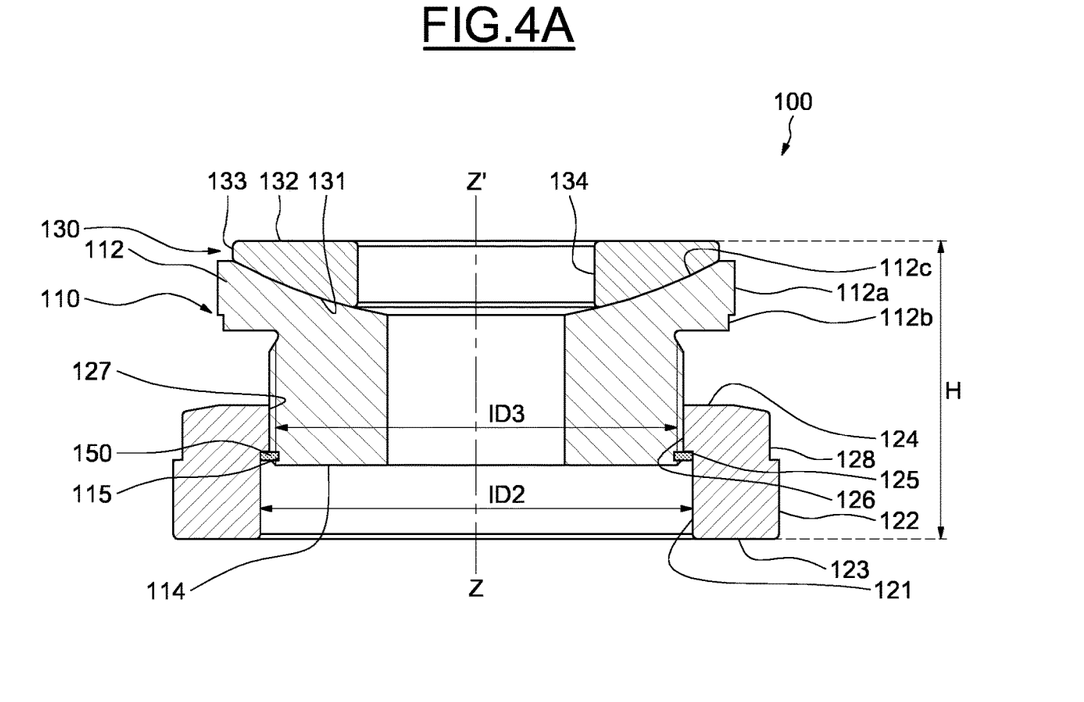
FIGS. 4A and 4B are cross-section views of an adjustable levelling pad according to another embodiment of the invention, respectively in an upper position and in a lower position of the shaft element relative to the lower adjustable part.
Figure 4B:
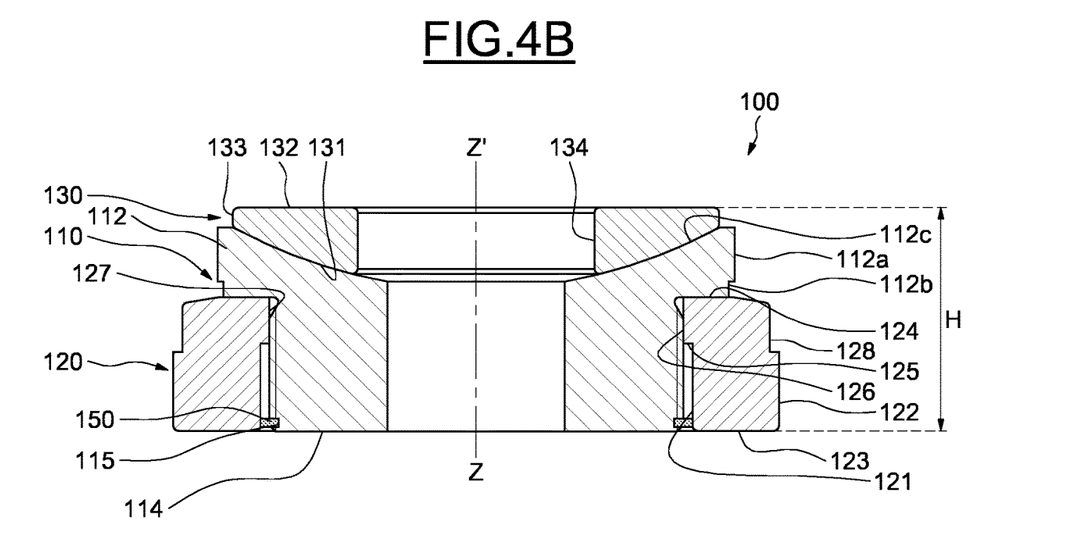

Another embodiment of an adjustable pad shown on FIGS. 4A and 4B, in which the same elements bear the same reference numerals, differs from the adjustable pad of FIG. 2B only by the fact that the adjustable pad does not comprise a protection cap 140 and comprises a mechanical limiter 150.

The mechanical limiter 150 is fastened to the outer circumference 111a of the upper portion 111 of the first component 110, notably in a recess 115. The mechanical limiter 150 is fastened at the lower end of the first component 110. The mechanical limiter 150 is here annular and mounted in an annular recess 115. Alternatively, the pad 100 may comprises two or more mechanical limiters, such as slugs arranged regularly on the circumference of the upper portion of the first component 110.

The outer diameter of the mechanical limiter 150 is greater than the inner diameter of threaded wall 126 of the second component 120 and less than the inner diameter of the shoulder 125 of the second component 120, so that when the first component 110 is unscrewed from the second component 120, the mechanical limiter 150 is configured to abut axially against the shoulder 125 of the second component 120, which avoids the first component 110 from being detached from the second component 120. After installation of the first component 110 in the second component 120, the mechanical limiter 150 is mounted from the bottom in the recess 115.

Figure 5:
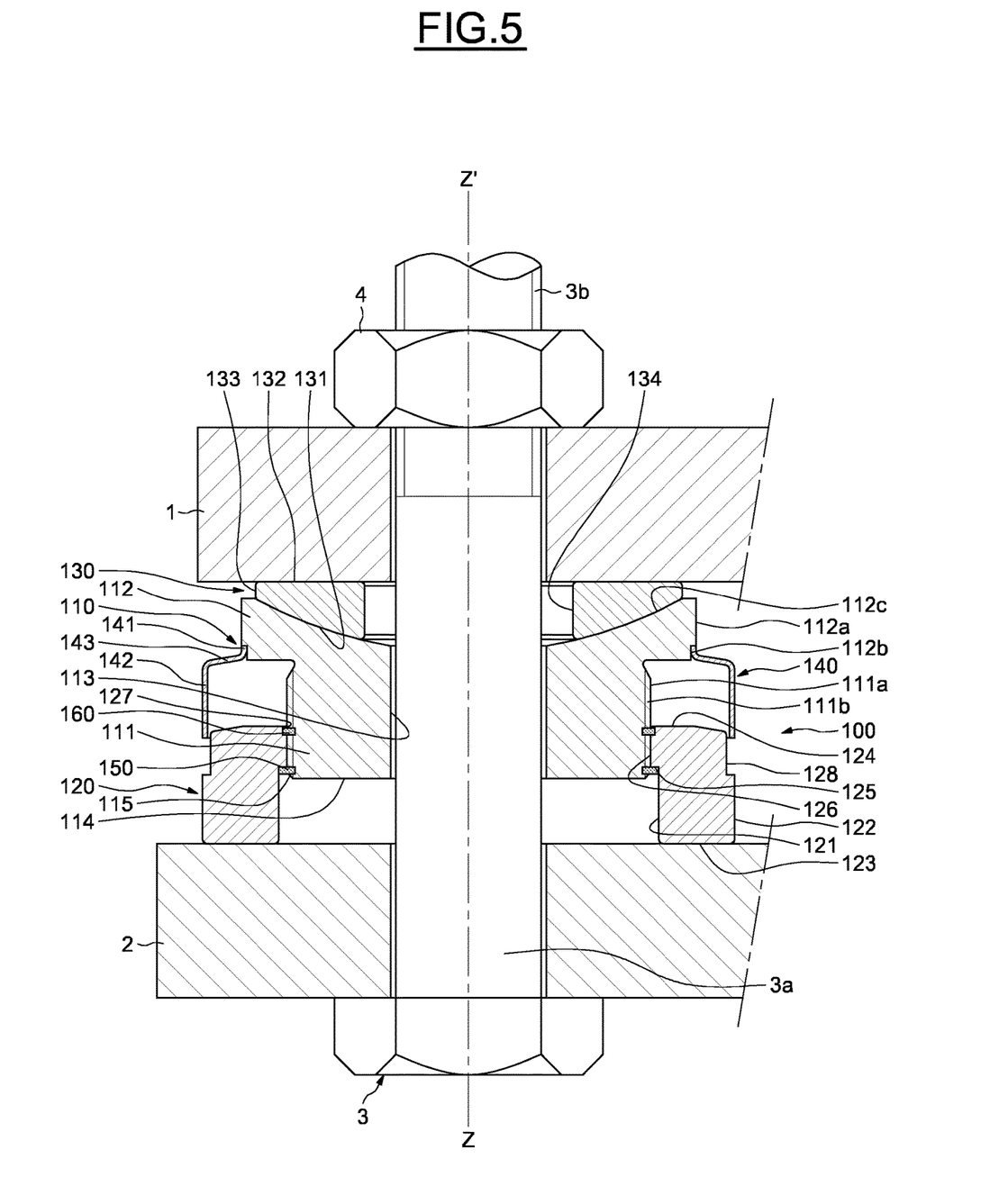
FIG. 5 is a cross-section view of an adjustable levelling pad according to another embodiment of the invention.

As shown on FIG. 5, the adjustable pad 100 combines the use of a protection cap 140 as described in reference to FIG. 2B, an annular sealing element 160 as described in reference to FIG. 3 and a mechanical limiter 150 as described in reference to FIGS. 4A and 4B.

Figure 6:
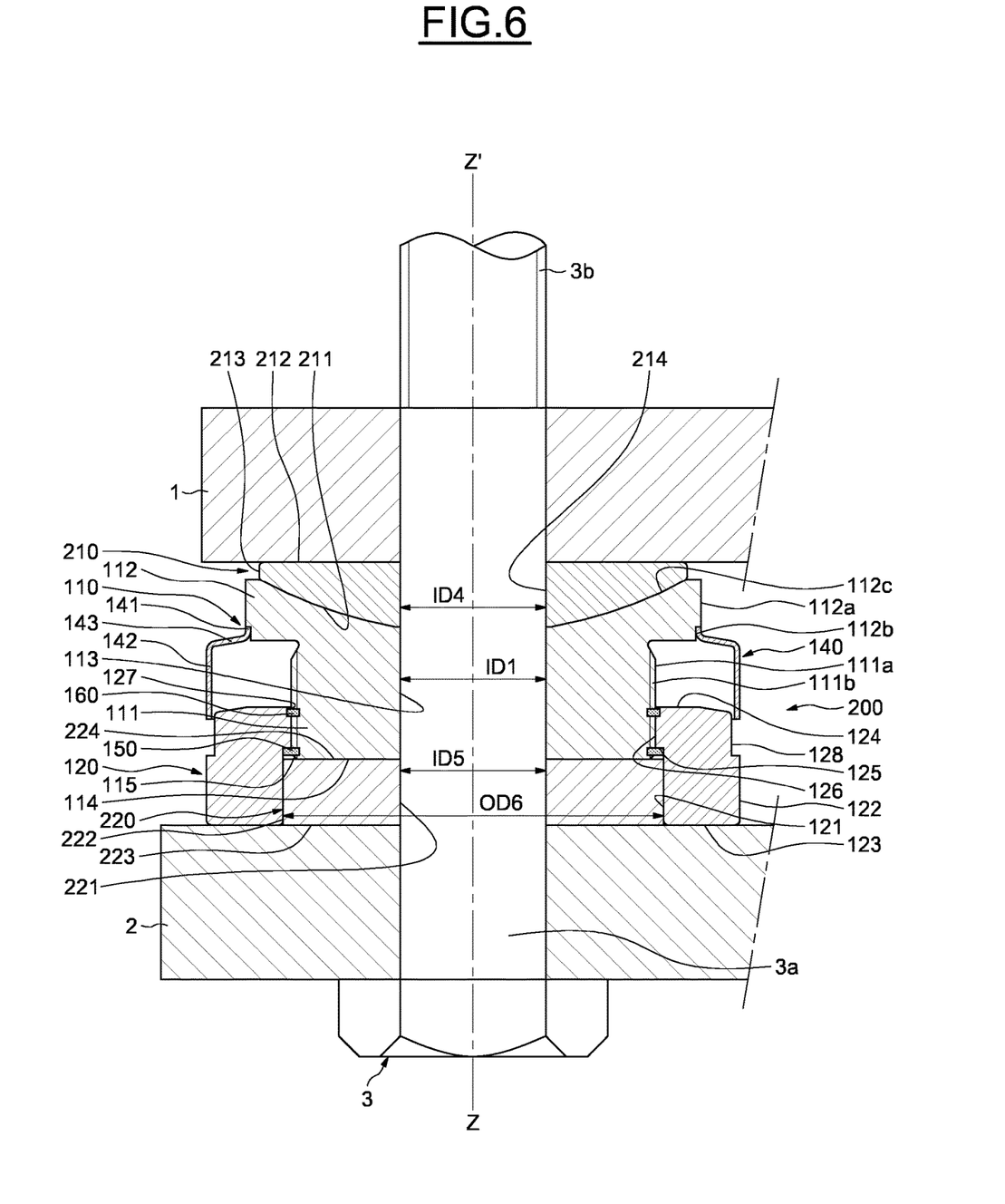
FIG. 6 is a cross-section view of an adjustable levelling pad according to another embodiment of the invention, in operational use.

Another embodiment of an adjustable pad shown on FIG. 6, in which the same elements bear the same reference numerals, differs from the adjustable pad of FIG. 2A only by the fact that the adjustable pad comprises a shear plate 220 and that the diameter ID4 of the through-hole 134 of the third component 130 is substantially equal to the diameter of the fitted part 3a of the bolt 3.

As illustrated in FIG. 6, the bolt 3 is a fitted bolt having a fitted part 3a and a threaded part 3b, the fitted part 3a having a diameter greater than the diameter of the threaded part 3b.

In this embodiment, the adjustable pad 200 is in operational use between a frame 1 of a machine and a support 2. FIG. 6 shows an assembly comprising the frame 1 of a machine, the support 2 and the adjustable pad 200 configured to fix the frame 1 to the support 2 with a fitted bolt 3.

The shear plate 220 of the adjustable pad 200 is radially delimited by an inner cylindrical wall 221 having an inner diameter ID5 and an outer cylindrical wall 222 having an outer diameter OD6. The outer diameter OD6 fits the inner diameter ID2 of the second component 120.

The diameter ID5 of the through-hole 221 of the shear plate 220 is smaller or equal to the inner diameter ID1 of the first component 110.

The shear plate 220 is further axially delimited by a lower surface 223 bearing on the support 2 and an upper surface 224 axially located below the shoulder 125 of the second component 120.

The third component 210 and the shear plate 220 are drilled and reamed at location, so that the diameter ID4 of the through-hole 134 of the third component 210 and the diameter ID5 of the through-hole of the shear plate 220 are substantially equal to the outer diameter of the fitting part 3a. The shear plate is thus in radial contact with the fitting part 3a of the fitting bolt 3. The inner wall of the third component 210 is also in radial contact with the fitting part 3a of the fitting bolt 3.

As illustrated on FIG. 6, the inner diameter ID1 of the inner wall 113 of the first component 110 is substantially equal to the outer diameter of the fitting part 3a. The inner wall 113 of the first component 110 is also reamed at location.

The shear plate 220, is for example, made in steel, for example in carbon steel CK45.

When a radial thrust force F is applied to the frame 1 of the machine, the shear plate 220 allows a significant reduction in bending forces applied to the fitted part 3a of the fitted bolt 3. Adding a third component 210 having a through-hole having a diameter substantially equal to the outer diameter of the shank 3a allows such bending forces to be avoided.

The third component 210 or bearing element sits between the frame 1 of the machine and the upper portion 112 of the first component 110. As shown in FIG. 6, the third component 210 has a lower surface 211 engaging with the upper surface 112c of the upper portion 112 of the first component 110. The lower surface 211 has a convex shape and is rotationally symmetrical.

The lower surface 211 and the upper surface 112c are complementarily shaped so as to facilitate slight adjustment of the positions between the first component 110 and the third component 210 relative to one another, for example, in order to accommodate slight deviations from the piece of machinery 1 and the support 2.

The third component 210 has further a substantially planar upper bearing surface 212 configured to support the frame 1 of the machine. The third component 210 is radially delimited by an outer cylindrical wall 213 and an inner cylindrical wall 214 forming a third through hole receiving the fitted part 3a of the fitted bolt 3. The outer cylindrical wall 213 of the third component 210 has an outer diameter greater than the outer diameter of the lower portion 111 of the first component 110 and less than the outer diameter of the flange 112 of the first component 110.

The assembly is assembled as follows.

The first component 110, the second component 120 and the third component 210 are mounted together. After the second component 120 is positioned on the upper surface of the support 2, the first component 110 is adjusted in height until the upper surface 212 of the third component 210 makes contact and aligns itself to the support frame 1 of the machine.

Adjusted height of the adjustable pad 200 is then measured. After measurement of the height, the adjustable pad 200 is dismounted. The thickness of the shear plate 220 can now be determined. The blind shear plate 220 is mounted in the second component 120.

The complete adjustable pad 200, the first component 110, the second component 120, the third component 210 and the shear plate 220 can now be slid in the available gap between the lower surface of the support frame 1 of the machine and the upper surface of support 2.

The shear plate 220 and the third component 210 have to be locked against rotation. The foundation bolt hole can now be drilled using the existing hole of the support frame 1 of the machine as a guidance. After drilling the foundation bolt hole through the first component 110, the second component 120, the shear plate 220 and the support frame 2, the drilled hole has to be reamed to the final diameter.

After reaming of the bolt hole, the hole diameter can be measured. Based upon the results of the measurement, the fitted bolt 3 can be machined to the final diameter. The fitted bolt 3 is then mounted from the bottom of support 2. The fitted bolt 3 is preferably mounted from the top of the frame 1 of the machine.

As shown on FIG. 6, the adjustable pad 200 comprises a first component 110 having a lower portion 111 and an upper flange 112 and further comprises an annular protection cap 140 fastened to the upper flange 112 of the first component 110. Alternatively, the adjustable pad 200 may only comprise a lower portion 111. In such case, the adjustable pad 200 may not comprise a protection cap 140 as described in reference to FIGS. 2A and 2B.

As shown on FIG. 6, the adjustable pad 200 comprises an annular sealing element 160, as described in reference to FIG. 3, fastened in an annular groove 127 provided on the inner wall 125 of the second component 120 at the upper end of the second component 120, and a mechanical limiter 150, as described in reference to FIGS. 4A and 4B, fastened to the outer circumference 111a of the upper portion 111 of the first component 110, notably in a recess 115. However, the adjustable pad 200 may not comprise an annular sealing element 160 and a mechanical limiter 150.

It should be noted that the adjustable pad has been described with reference to an exemplary embodiment in which the first component is provided with an outer screw thread and a second component provided with an inner screw thread. However, the invention also relates to embodiments in which the outer circumference of the second component is provided with and outer screw thread and the first component comprises an inner screw thread. In such embodiment, the first component may be provided with a flange and the protection cap may be fastened to the flange and extend towards the second component.

Thanks to the invention, entry of outer particles into the threaded joint is diminished and preferably entirely prevented.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved adjustable leveling pads.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. An adjustable levelling pad comprising:
   a first component provided with first screw threads;
   a second component provided with second screw threads cooperating with the first screw threads of the first component; and
   a bearing element having a bearing surface cooperating with the first component,
   wherein the adjustable levelling pad comprises a protection cap fastened to the first component and extending towards the second component, the protection cap at least partially surrounding the second component and being configured to cooperate in a sealing manner with the second component,
   wherein the first component has a first maximum width,
   wherein the second component has a second maximum width greater than the first maximum width,
   wherein the protection cap comprises an annular mounting portion fastened to the first component and an annular protection flange extending towards the second component and radially surrounding an outer circumference of the second component in a sealing manner,
   wherein the annular mounting portion extends axially along an axis substantially parallel to an outer wall of the first component and the annular protection flange extends axially along an axis substantially parallel to an outer wall of the second component, and
   wherein the annular protection flange is connected to the annular mounting portion by a connecting portion extending along an axis inclined relative to an axis perpendicular to the annular protection flange.

2. The adjustable levelling pad according to claim 1,
   wherein the first component is rotatable relative to the second component between a partially screwed position in which the first screw threads of the first component partially cooperate with the second screw threads of the second component and a fully screwed position in which the first component axially contacts an upper surface of the second component, and
   wherein the protection cap is configured to slide freely along the outer circumference of the second component when the first component is moved between the partially screwed position and the fully screwed position.

3. The adjustable levelling pad according to claim 1, wherein the annular mounting portion is mounted in an annular groove on a circumference of the first component.

4. The adjustable levelling pad according to claim 1, wherein the first component comprises a first portion having a first maximum outer diameter and a second portion having a second maximum outer diameter greater than the first maximum outer diameter, the first portion having the first screw threads and the protection cap being fastened to the second portion.

5. The adjustable levelling pad according to claim 1, further including an annular sealing element fastened in an annular groove provided on a wall of the second component having the second screw threads, the annular sealing element being deformable and configured to deform over the first screw threads between an initial position and a radially compressed position when the first component is mounted in the second component.

6. The adjustable levelling pad according to claim 1, wherein the outer wall of the second component comprises an annular recess in which the annular protection flange of the protection cap is received.

7. The adjustable levelling pad according to claim 6, including a mechanical limiter fastened to an outer circumference of the first component and configured to abut axially against a shoulder on an inner wall of the second component when the first component is unscrewed from the second component.

8. The adjustable levelling pad according to claim 1, including a mechanical limiter fastened to an outer circumference of the first component and configured to abut axially against a shoulder on an inner wall of the second component when the first component is unscrewed from the second component.

9. An assembly comprising:
a piece of machinery;
a support; and
the adjustable levelling pad according to claim 1 located between the piece of machinery and the support with a top surface of the bearing element in contact with the piece of machinery and a bottom surface of the second component in contact with the support.

10. An adjustable levelling pad comprising:
a first component provided with first screw threads;
a second component provided with second screw threads cooperating with the first screw threads of the first component;
a bearing element having a bearing surface cooperating with the first component;
a protection cap fastened to the first component and extending towards the second component, the protection cap at least partially surrounding the second component and being configured to cooperate in a sealing manner with the second component; and
a mechanical limiter fastened to an outer circumference of the first component and configured to abut axially against a shoulder on an inner wall of the second component when the first component is unscrewed from the second component,
wherein the first component has a first maximum width, and
wherein the second component has a second maximum width greater than the first maximum width.

11. The adjustable levelling pad according to claim 10, wherein the first component is rotatable relative to the second component between a partially screwed position in which the first screw threads of the first component partially cooperate with the second screw threads of the second component and a fully screwed position in which the first component axially contacts an upper surface of the second component, and
wherein the protection cap is configured to slide freely along an outer circumference of the second component when the first component is moved between the partially screwed position and the fully screwed position.

12. The adjustable levelling pad according to claim 11, wherein the protection cap comprises an annular mounting portion fastened to the first component and an annular protection flange extending towards the second component and radially surrounding the outer circumference of the second component in a sealing manner and a connecting portion connecting the annular mounting portion to the annular protection flange, and
wherein the connecting portion extends along an axis inclined relative to an axis perpendicular to the annular protection flange.

13. An assembly comprising:
a piece of machinery;
a support; and
the adjustable levelling pad according to claim 10 located between the piece of machinery and the support with a top surface of the bearing element in contact with the piece of machinery and a bottom surface of the second component in contact with the support.

* * * * *